United States Patent
Chae et al.

(10) Patent No.: US 12,454,588 B2
(45) Date of Patent: Oct. 28, 2025

(54) POWDER TYPE POLYPROPYLENE RESIN AND METHOD FOR PREPARING THE SAME

(71) Applicant: LG CHEM, LTD., Seoul (KR)

(72) Inventors: Seong Min Chae, Daejeon (KR); Jihwa Ye, Daejeon (KR); Kyung Seop Noh, Daejeon (KR); Heekwang Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 558 days.

(21) Appl. No.: 18/014,055

(22) PCT Filed: Sep. 8, 2021

(86) PCT No.: PCT/KR2021/012173
§ 371 (c)(1),
(2) Date: Dec. 30, 2022

(87) PCT Pub. No.: WO2022/055234
PCT Pub. Date: Mar. 17, 2022

(65) Prior Publication Data
US 2023/0257494 A1    Aug. 17, 2023

(30) Foreign Application Priority Data

Sep. 8, 2020  (KR) .................. 10-2020-0114809
Sep. 7, 2021  (KR) .................. 10-2021-0119264

(51) Int. Cl.
*C08F 110/06*    (2006.01)
*C08L 23/12*    (2006.01)

(52) U.S. Cl.
CPC ........ *C08F 110/06* (2013.01); *C08F 2500/03* (2013.01); *C08F 2500/12* (2013.01); *C08F 2500/24* (2013.01); *C08L 23/12* (2013.01)

(58) Field of Classification Search
None
See application file for complete search history.

(56) References Cited

U.S. PATENT DOCUMENTS

| | | |
|---|---|---|
| 4,729,772 A | 3/1988 | Asanuma et al. |
| 5,476,911 A | 12/1995 | Morini et al. |
| 5,965,478 A * | 10/1999 | Goto .............. C08F 10/00 502/115 |
| 5,968,703 A | 10/1999 | Maniar et al. |
| 2003/0149199 A1 | 8/2003 | Schottek et al. |
| 2006/0020096 A1 | 1/2006 | Schottek et al. |
| 2020/0031962 A1 | 1/2020 | Kim et al. |
| 2020/0123279 A1 * | 4/2020 | Kanellopoulos ..... C08F 2/01 |
| 2021/0078205 A1 | 3/2021 | Park et al. |

FOREIGN PATENT DOCUMENTS

| | | | |
|---|---|---|---|
| CN | 110382567 A | 10/2019 | |
| CN | 110709428 A | 1/2020 | |
| CN | 110882664 A | 3/2020 | |
| EP | 3418309 A1 | 12/2018 | |
| JP | 5134810 B2 | 1/2013 | |
| KR | 2002-0084423 A | 11/2002 | |
| KR | 10-2011-0074042 A | 6/2011 | |
| KR | 10-1189901 B1 | 10/2012 | |
| KR | 10-2018-0051222 A | 5/2018 | |
| KR | 10-2019-0070724 A | 6/2019 | |
| KR | 10-2019-0141003 A | 12/2019 | |
| KR | 10-2020-0049589 A | 5/2020 | |
| KR | 10-2020-0052225 A | 5/2020 | |
| KR | 10-2020-0052775 A | 5/2020 | |
| KR | 20200049589 A * | 5/2020 | ......... D04H 1/4291 |
| WO | 01/48034 A2 | 7/2001 | |
| WO | 2012/000956 A1 | 1/2012 | |

OTHER PUBLICATIONS

Office Action dated Oct. 27, 2023, of the corresponding Chinese Patent Application No. 202180046371.1.
Extended European Search Report dated Dec. 4, 2023, of the corresponding European Patent Application No. 21867100.6.
Office Action dated Feb. 17, 2025 issued in corresponding Korean Patent Application No. 10-2021-0119264.
International Search Report (with translation) and Written Opinion dated Dec. 30, 2021, issued in corresponding International Patent Application No. PCT/KR2021/012173.

\* cited by examiner

*Primary Examiner* — Richard A. Huhn
(74) *Attorney, Agent, or Firm* — Morgan, Lewis & Bockius LLP

(57) ABSTRACT

According to this invention, there are provided powder type polypropylene resin wherein flowability in a hooper and feeding stability in the feeding zone of an extruder are improved through morphology optimization such as decrease in fine powder content, narrow particle size distribution, increase in average particle size, and high melting point, and the like, and a method for preparing the same.

12 Claims, No Drawings

POWDER TYPE POLYPROPYLENE RESIN AND METHOD FOR PREPARING THE SAME

TECHNICAL FIELD

Cross-Reference to Related Application(s)

This application claims the benefit of Korean Patent Application No. 10-2020-0114809 filed on Sep. 8, 2020 and Korean Patent Application No. 10-2021-0119264 filed on Sep. 7, 2021 with the Korean Intellectual Property Office, the disclosures of which are herein incorporated by reference in their entirety.

This invention relates to powder type polypropylene resin wherein flowability in a hooper and feeding stability in the feeding zone of an extruder are improved through morphology optimization.

BACKGROUND ART

In general, non-woven fabric is a sheet or web structure prepared by bonding fibers, threads or filaments, by mechanical, thermal or chemical bonding without passing through a spinning, weaving or knitting process. It is also named as adhesive fabric or bonded fabric. Such non-woven fabric may be prepared by various methods, and needle punching, chemical bonding, thermal bonding, melt blown, spun lace, stitch bond and spun bond methods are known.

Among them, a melt blown method is a method of inflowing high temperature high pressure air flow in the outlet of spinning nozzle to draw and open fibers, and then, accumulating them on a collecting conveyer, and since it can prepare ultra-fine fiber with single fiber diameter of about 1~10 micron (common fiber 10~30 micron), it is mainly used for the preparation of non-woven fabric requiring filter and water resistant properties.

In the case of melt blown non-woven fabric using polypropylene-based resin as raw material, previously, a Ziegler Natta catalyst was mainly applied to obtain polypropylene with high flowability, and then, it was melt-spun to prepare polypropylene fiber and non-woven fabric comprising the same. However, the Ziegler Natta catalyst has low hydrogen reactivity, in order to prepare polypropylene with high flowability using the same, vis-breaking should be conducted using a peroxide-based decomposition accelerator or a controlled rheology (cR) process should be conducted.

In this case, due to the action of the peroxide-based decomposition accelerator, heat resistance or weather resistance of the finally prepared fiber and non-woven fabric became deteriorated, and thus, discoloration and shrinkage were generated. And, when such non-woven fabric is secondly processed and stored so as to apply for various uses such as a mask or sound absorber, and the like, mechanical properties and other properties of the non-woven fabric were deteriorated. Furthermore, polypropylene resin prepared using a Ziegler Natta catalyst has broad molecular weight distribution, and thus, there is a limit to the production of fine denier fiber, and due to large fiber thickness deviation, self-bonding occurs. As the result, degree of bulkiness decreases, and differential pressure increases, and thus, there is also a limit to the application for a filter or mask, and the like.

Meanwhile, since polypropylene resin prepared using a metallocene catalyst has narrow molecular weight distribution, it can prepare fiber having thin and uniform thickness, and thus, can prepare low basic weight non-woven fabric with excellent strength.

Among melt blown metallocene polypropylene resins, products having melt index (MI) of 1700 to 2300 g/10 min are hardly produced in the form of pellets due to the low viscosity property, and thus, they are supplied in the market as powder or flake-type.

However, in the case of powder type polypropylene, due to high content of fine powder having particle size less than 500 μm existing in the resin, broad molecular weight distribution, and small particle size, during melt blown spinning, the introduction of raw material is unstable and discharge amount is lowered. Specifically, due to the formation of scale in hooper, feeding amount is lowered and unstable, and melting due to high surface are of powder in solid conveying section generates plugging, and the subsequent raw material transfer to compression section is lowered and feeding unstability is generated. And, there is problems in terms of decrease in gear pump shear pressure and generation of hunting, and due to increase in extruder screw torque (load) and generation of hunting, spinning is unstable.

Thus, there is a demand for studies on the preparation of powder type polypropylene resin that has narrow particle size distribution as well as optimum particle size, and has decreased fine powder content in the resin.

DETAILED DESCRIPTION OF THE INVENTION

Technical Problem

It is an object of the invention to provide powder type polypropylene resin wherein flowability in a hooper and feeding stability in the feeding zone of an extruder are improved through morphology optimization such as decrease in fine powder content, narrow particle size distribution, increase in average particle size, and high Tm, and the like, and a method for preparing the same.

Technical Solution

According to one embodiment of the invention, there is provided powder type polypropylene resin comprising homo polypropylene, and satisfying the following requirements:
 (i) melt index measured under load of 2.16 kg at 230° C. according to ASTM D1238: 500 to 3000 g/10 min,
 (ii) melting point: 155° C. or more,
 (iii) SPAN according to the following Mathematical Formula 1: 0.6 or less,
 (iv) average particle size $D_{50}$: greater than 1200 μm and 1600 μm or less, and
 (v) content of fine powder having particle size less than 500 μm: 2 wt % or less, based on the total weight of polypropylene resin:

$$SPAN = (D_{90} - D_{10})/D_{50} \quad \text{[Mathematical Formula 1]}$$

in the Mathematical Formula 1, $D_{50}$ is a particle size of homo polypropylene at 50% point of cumulative distribution, $D_{90}$ is a particle size of homo polypropylene at 90% point of cumulative distribution, and $D_{10}$ is a particle size of homo polypropylene at 10% point of cumulative distribution, in the cumulative distribution of particle number according to the particle size of homo polypropylene According to another embodiment of the invention, there is provided a method for preparing the powder type polypropylene resin, comprising a step of polymerizing propylene monomers while introducing hydrogen gas, in the presence of a catalyst composition comprising a transition metal compound represented by the following Chemical Formula 1, to prepare homo polypropylene; and a fine cut step of separating and removing fine powder having particle size less than 500 μm from the homo polypropylene;

wherein the fine cute step comprises conducting one or more processes selected from the group consisting of a fine powder removal process using a cyclone, a fine powder removal process using a vibrator screen, and a fine powder removal process by blowing injection:

[Chemical Formula 1]

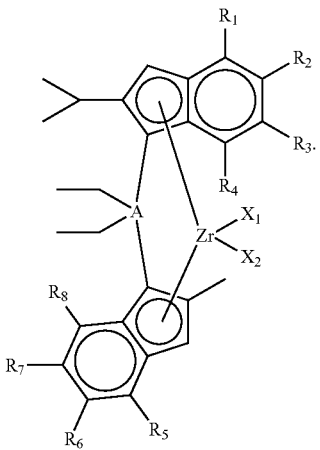

in the Chemical Formula 1,

A is carbon, silicon or germanium, $X_1$ and $X_2$ are each independently, halogen, $R_1$ and $R_5$ are each independently, $C_{6-20}$ aryl substituted with $C_{1-20}$ alkyl, $R_2$ to $R_4$, and $R_6$ to $R_8$ are each independently, hydrogen, halogen, $C_{1-20}$ alkyl, $C_{2-20}$ alkenyl, $C_{1-20}$ alkylsilyl, $C_{1-20}$ silylalkyl, $C_{1-20}$ alkoxysilyl, $C_{1-20}$ ether, $C_{1-20}$ silylether, $C_{1-20}$ alkoxy, $C_{6-20}$ aryl, $C_{7-20}$ alkylaryl, or $C_{7-20}$ arylalkyl.

According to yet another embodiment of the invention, there is provided fiber, specifically melt blown non-woven fabric, prepared using the powder type polypropylene resin.

Advantageous Effects

The powder type polypropylene resin according to this invention has optimized morphology, such as decreased content of fine powder having particle size less than 500 μm in the resin, narrow particle size distribution, increased average particle size and high Tm, and the like, thus exhibiting excellent feeding stability. Thus, during melt blown spinning or extrusion using the resin, discharge amount and gear pump shear pressure increase, and gear pump shear pressure and extruder torque (load) are stabilized, thereby exhibiting improved spinning stability and processability.

DETAILED DESCRIPTION OF THE EMBODIMENTS

The terms used herein are only to explain specific embodiments, and are not intended to limit the invention. A singular expression includes a plural expression thereof, unless it is expressly stated or obvious from the context that such is not intended. As used herein, the terms "comprise", "equipped" or "have", etc. are intended to designate the existence of practiced characteristic, number, step, constructional element or combinations thereof, and they are not intended to preclude the possibility of existence or addition of one or more other characteristics, numbers, steps, constructional elements or combinations thereof.

Although various modifications can be made to the invention and the invention may have various forms, specific examples will be illustrated and explained in detail below. However, it should be understood that these are not intended to limit the invention to specific disclosure, and that the invention includes all the modifications, equivalents or replacements thereof without departing from the spirit and technical scope of the invention.

Hereinafter, powder type polypropylene resin and a method for preparing the same according to specific embodiments of the invention will be explained.

According to the invention, through morphology optimization during the preparation of powder type polypropylene resin, feeding stability may be improved, and thus, during extrusion such as melt blown spinning using the resin, discharge amount and gear pump shear pressure may be increased, and gear pump shear pressure and extruder torque (load) may be stabilized, thereby exhibiting improved spinning stability and processability.

Specifically, powder type polypropylene resin according to one embodiment of the invention comprises homo polypropylene, and satisfies the following requirements (i) to (v):

(i) melt index measured under load of 2.16 kg at 230° C. according to ASTM D1238: 500 to 3000 g/10 min, (ii) melting point: 155° C. or more, (iii) SPAN according to the following Mathematical Formula 1: 0.6 or less, (iv) average particle size D50: greater than 1200 μm and 1600 μm or less, and (v) content of fine powder having particle size less than 500 μm: 2 wt % or less, based on the total weight of polypropylene resin:

$$SPAN=(D90-D10)/D50 \quad \text{[Mathematical Formula 1]}$$

in the Mathematical Formula 1, D50 is a particle size of homo polypropylene at 50% point of cumulative distribution, D90 is a particle size of homo polypropylene at 90% point of cumulative distribution, and D 10 is a particle size of homo polypropylene at 10% point of cumulative distribution, in the cumulative distribution of particle number according to the particle size of homo polypropylene.

As used herein, "powder" or "powder-type" is small particle or piece formed without extrusion of raw material, and comprises all the forms classified as powder in the technical field to which the invention pertains, such as spherical, flat, flake, polygonal, rod shape, and the like. Although the size is appropriately determined according to use and shape and is not specifically limited, it commonly has a small average particle size of 1 mm level. And, pellet formed by extrusion of raw material, and powder prepared without extrusion may be divided on the basis of bulk density or average particle diameter, and the like. Considering that those having average diameters of 2 mm or more, or 3 mm or more, and 200 mm or less, or 100 mm or less, or 5 mm or less, and bulk densities of 0.6 g/ml or less, more specifically 0.35 to 0.6 g/ml are commonly defined as pellets, in this disclosure, those having average diameters less than 2 mm, more specifically 1.5 mm or less, or 1 mm or less, and greater than 0 mm are defined as powders. Wherein, the "diameter" is the longest distance among any linear distances of the outer circumferential surface of powder, and may be measured using imaging microscope.

More specifically, the powder type polypropylene resin according to one embodiment of the invention comprises homo polypropylene with high flowability, and thus, exhibits high melt index (MI) of 500 to 3000 g/10 min. Specifically, melt index (MI) measured under load of 2.16 kg at 230° C. according to ASTM (American society for testing and materials) standard ASTM D 1238, is greater than 500 g/10 min, or 1000 g/10 min or more, or 1500 g/10 min or more, or 1700 g/10 min or more, or 1750 g/10 min or more, or 1800 g/10 min or more, and 3000 g/10 min or less, or 2300 g/10 min or less, or 2290 g/10 min or less, or 2280 g/10 min or less, or 2250 g/10 min or less.

Commonly, MI can be controlled through the control of a catalyst used during polymerization of homo polypropylene, and the amount of hydrogen introduced, and in case the existing Ziegler-Natta catalyst is used, high content of hydrogen should be introduced in the polymerization step. However, in this disclosure, by using a transition metal compound of the above Chemical Formula 1 that has high hydrogen reactivity, and thus, exhibits excellent catalytic activity even if the introduction amount of hydrogen is decreased, and can prepare low molecular weight polymer due to steric hindrance by a substituent bonded to ligand, specifically an isopropyl group, homo polypropylene with high flowability is prepared and included, and thus, the polypropylene resin exhibits high melt index, and as the result, it may exhibit excellent spinnability.

Particularly, if MI is less than 500 g/10 min, process pressure may increase, and thus, processability may be deteriorated. And, if MI is greater than 3000 g/10 min, due to low molecular weight, fogging property (or TVOC) may increase in the final product such as a sound absorber, and the like, and a drying process is additionally required. In this regard, the powder type polypropylene resin according to the invention has melt index within the above range, thus enabling preparation of high strength fiber without concern about occurrence of the above problems.

And, the powder type polypropylene resin according to one embodiment of the invention has high melting point (Tm) of 155° C. or more, as well as high MI as described above. By having high Tm, it may have increased crystallization temperature and high stereoregularity, and thus, exhibit excellent heat resistance. And, due to high Tm, melting of polypropylene resin in the feeding zone of an extruder may be prevented during spinning. If Tm is less than 155° C., heat resistance may be lowered, and there is a concern about decomposition by heat during fiber processing at high temperature. More specifically, considering the Tm of the powder type polypropylene resin of 155° C. or more, or 156° C. or more, and sufficient processability and excellent thermal stability required during extrusion, the Tm may be 170° C. or less, or 160° C. or less.

Meanwhile, in this disclosure, the Tm of the powder type polypropylene resin may be measured by increasing the temperature of resin to 200° C., maintaining at that temperature for 5 minutes, decreasing the temperature to 30° C., and then, increasing the temperature again, and determining the top of DSC (Differential Scanning calorimeter, manufactured by TA Corporation) curve as the melting point. Wherein, the temperature increase and decrease speeds are 10° C./min, respectively, and Tm is the result of measuring in the second temperature increase section.

And, since the powder type polypropylene resin according to one embodiment of the invention comprises homo polypropylene prepared by a controlled polymerization process, wherein a fine cut process is conducted for the homo polypropylene, it has narrow particle size distribution, high average particle size and low fine powder content.

Specifically, the powder type polypropylene resin has low SPAN of 0.6 or less.

The SPAN is a value exhibiting a degree of uniformity of particle size, and it may be calculated by the Mathematical Formula 1, and the smaller the value, the smaller the particle size deviation. Since the powder type polypropylene of the invention has low SPAN of 0.6 or less as described above, it has uniform particle size and low fine powder content in the resin. Specifically, the polypropylene resin has SPAN of 0.6 or less, or less than 0.6, and 0.01 or more, or 0.1 or more.

In this disclosure, particle size distribution is measured using a particle size analyzer, specifically a laser diffraction particle size measuring device, and then, from the result, SPAN may be calculated according to the Mathematical Formula 1. Specific measurement method will be explained in detail later in experimental examples.

Meanwhile, in this disclosure, a particle size "Dn" means a particle size or particle diameter at n % point of cumulative distribution of particle number according to particle size. Namely, D50 denotes particle size at 50% point of cumulative distribution of particle number according to particle size, D90 denotes particle size at 90% point of cumulative distribution of particle number according to particle size, and D10 denotes particle size at 10% point of cumulative distribution of particle number according to particle size. The Dn can be measured using a laser diffraction method, and the like. Specifically, powder to be measured is dispersed in a dispersion medium, and then, introduced in a commercially available laser diffraction particle size measuring device (for example, Microtrac S3500), and when the particles pass through laser beam, difference in diffraction pattern according to particle size is measured to calculate particle size distribution. By calculating particle sizes at 10%, 50% and 90% points of cumulative distribution of particle number according to particle size in the measuring device, D10, D50 and D90 can be measured.

And, the powder type polypropylene resin has high average particle size (D50) greater than 1200 μm, more specifically greater than 1200 μm and 1600 μm or less.

In case the average particle size of the powder type polypropylene resin is 1200 μm or less, due to high surface area of powder, it may be easily molten to generate plugging in solid conveying section during extrusion. Meanwhile, the average particle size of powder type polypropylene resin is determined by the properties of a catalyst used during polymerization, and as the catalytic activity is higher, the average particle size of polypropylene resin prepared may increase, thus exhibiting excellent spinning stability and extrusion stability. However, if a ultra-highly active catalyst is used in order to increase average particle size, there is a concern about occurrence of fouling. Thus, considering the properties of the catalyst used in this disclosure and difficulty in the preparation process, the average particle size of the powder type polypropylene resin of the invention may be 1600 μm or less.

Since the powder type polypropylene resin of the invention has an average particle size in the optimum range as explained above, there is no concern about melting and the resulting plugging, and thus, there is no problem in terms of deterioration or destabilization of raw material transfer. More specifically, the powder type polypropylene resin has an average particle size of 1300 μm or more, or 1400 μm or more, or 1500 μm or more, or 1530 μm or more, or 1550 μm or more, and 1600 μm or less, or 1590 μm or less, or 1585 μm or less, or 1580 μm or less.

The average particle size (D50) of the powder type polypropylene resin and the measurement method are as explained above.

And, in the powder type polypropylene resin, the content of fine powder having particle size less than 500 μm is as low as 2 wt % or less, more specifically 1.5 wt % or less, or 1.2 wt % or less, or 1 wt % or less, based on the total weight of the resin. Thus, during extrusion using the polypropylene resin, there is no problem in terms of deterioration of spinnability due to increase in the instability of raw material introduction, decrease in discharge amount, decrease in gear pump shear pressure, increase in extruder screw torque (load), and the like. Although the lower fine powder content is preferable, considering the process, it may be 0.001 wt % or more, or 0.01 wt % or more.

Meanwhile, in this disclosure, the fine powder content in the polypropylene resin represents the content of fine powder having particle size less than 500 μm, obtained by vibrating the polypropylene resin for 10 minutes, and then, sieving it using a mesh (sieve size 500 μm), and filtering, based on the total weight of the polypropylene resin, and specific measurement method will be explained in detail later in experimental examples.

Besides the above explained requirements of MI, Tm, particle size distribution and fine powder content, the powder type polypropylene resin according to one embodiment of the invention may exhibit narrow molecular weight distribution (MWD) of 2.5 or less, due to the characteristic preparation method using a catalyst of a specific structure. If the molecular weight distribution is too large, there is a concern about deterioration of fiber processability, but in this disclosure, since the polypropylene resin has narrow molecular weight distribution of the above range as well as the optimum combination of properties, it may exhibit excellent fiber processability. More specifically, MWD of the polypropylene resin may be 2.5 or less, or 2.4 or less, or 2.3 or less, and 2.0 or more, or 2.1 or more, or 2.2 or more.

Meanwhile, in this disclosure, molecular weight distribution (MWD) may be determined by respectively measuring the weight average molecular weight (Mw) and number average molecular weight (Mn) of the polypropylene resin using gel permeation chromatography (GPC), and calculating the ratio (Mw/Mn) of the weight average molecular weight to the number average molecular weight. Specific measurement method will be explained in detail later in experimental examples.

More specifically, the powder type polypropylene resin according to one embodiment of the invention may further satisfy one or more, or 2 or more, or 3 or more, or all of the following requirements (i-1) to (v-1), in addition to the above requirements of (i) to (v):
  (i-1) melt index measured under load of 2.16 kg at 230° C. according to ASTM D1238: 1700 to 2300 g/10 min
  (ii-1) melting point: 155° C. to 170° C.
  (iii-1) SPAN according to the Mathematical Formula 1: 0.1 to 0.6
  (iv-1) average particle size D50: 1300 μm to 1600 μm
  (v-1) content of fine powder: 1.5 wt % or less.

More specifically, the powder type polypropylene resin may satisfy the above requirements (i) to (v); or further satisfy one or more, or 2 or more, or 3 or more, or all of the following requirements (i-1) to (v-1), in addition to the above requirements of (i) to (v): and simultaneously, satisfy molecular weight distribution of 2.5 or less, or 2.0 to 2.5, or the above explained range.

The powder type polypropylene resin having the above properties may be prepared by a preparation method comprising: a step of polymerizing propylene monomers while introducing hydrogen gas, in the presence of a catalyst composition comprising a transition metal compound represented by the following Chemical Formula 1, to prepare homo polypropylene; and a fine cut step of separating and removing fine powder having particle size less than 500 μm from the homo polypropylene. Thus, according to the invention, there is provided a method for preparing the above explained powder type polypropylene resin:

[Chemical Formula 1]

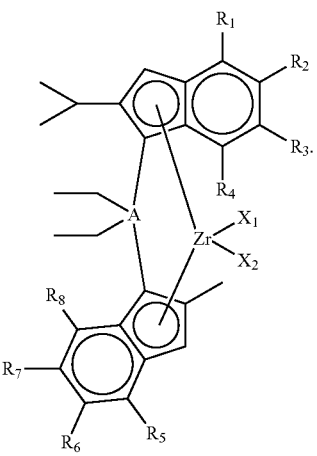

in the Chemical Formula 1,
A is carbon, silicon or germanium,
$X_1$ and $X_2$ are each independently, halogen,
$R_1$ and $R_5$ are each independently, $C_{6-20}$ aryl substituted with $C_{1-20}$ alkyl, $R_2$ to $R_4$, and $R_6$ to $R_8$ are each independently, hydrogen, halogen, $C_{1-20}$ alkyl, $C_{2-20}$ alkenyl, $C_{1-20}$ alkylsilyl, $C_{1-20}$ silylalkyl, $C_{1-20}$ alkoxysilyl, $C_{1-20}$ ether, $C_{1-20}$ silylether, $C_{1-20}$ alkoxy, $C_{6-20}$ aryl, $C_{7-20}$ alkylaryl, or $C_{7-20}$ arylalkyl.

Meanwhile, unless otherwise limited, the following terms may be defined as follows.

Halogen may be fluorine (F), chlorine (Cl), bromine (Br) or iodine (I).

A $C_{1-20}$ alkyl group may be a linear, branched or cyclic alkyl group. Specifically, $C_{1-20}$ alkyl group may be a $C_{1-15}$ linear alkyl group; a $C_{1-10}$ linear alkyl group; a $C_{1-5}$ linear alkyl group; a $C_{3-20}$ branched or cyclic alkyl group; $C_{3-15}$ branched or cyclic alkyl group; or $C_{3-10}$ branched or cyclic alkyl group. More specifically, the $C_{1-20}$ alkyl group may be methyl, ethyl, n-propyl, iso-propyl, n-butyl, iso-butyl, tert-butyl, n-pentyl, iso-pentyl, neo-pentyl or cyclohexyl group, and the like.

A $C_{2-20}$ alkenyl group may be a linear, branched or cyclic alkenyl group. Specifically, the $C_{2-20}$ alkenyl group may be a $C_{2-20}$ linear alkenyl group, a $C_{2-10}$ linear alkenyl group, a $C_{2-5}$ linear alkenyl group, a $C_{3-20}$ branched alkenyl group, a $C_{3-15}$ branched alkenyl group, a $C_{3-10}$ branched alkenyl group, a $C_{5-20}$ cyclic alkenyl group or a $C_{5-10}$ cyclic alkenyl group. More specifically, the $C_{2-20}$ alkenyl group may be ethenyl, propenyl, butenyl, pentenyl, or cyclohexenyl group, and the like.

$C_{6-30}$ aryl may mean monocyclic, bicyclic or tricyclic aromatic hydrocarbon. Specifically, the $C_{6-30}$ aryl may be phenyl, naphthyl or anthracenyl group, and the like.

$C_{7-30}$ alkylaryl may mean a substituent in which one or more hydrogen of aryl are substituted with alkyl. Specifically, the $C_{7-30}$ alkylaryl may be methylphenyl, ethylphenyl, n-propylphenyl, iso-propylphenyl, n-butylphenyl, iso-butylphenyl, tert-butylphenyl or cyclohexylphenyl, and the like.

$C_{7-30}$ arylalkyl may mean a substituent in which one or more hydrogen of alkyl are substituted with aryl. Specifically, the $C_{7-30}$ arylalkyl may be benzyl, phenylpropyl or phenylhexyl, and the like.

In the preparation method, the catalyst composition comprises a compound of the above Chemical Formula 1 as a single catalyst. Thus, compared to the previous case of using two or more kinds of catalyst in combination, molecular weight distribution of prepared homo polypropylene may become remarkably narrow.

Moreover, since the compound of the Chemical Formula 1 comprises a divalent functional group A bisubstituted with ethyl groups as a bridge group connecting two ligands including indenyl groups, atomic size increases compared to the existing carbon bridge, and thus, an available angle increases, and monomer access is easy, thereby exhibiting excellent catalytic activity. And, two ethyl groups bonded to A may increase solubility, and thus, improve support efficiency, and they can solve the problem of decrease in support reactivity due to poor solubility during the preparation of a supported catalyst, in case a methyl group is included as the substituent of a bridge in the prior art.

And, since the 2 positions of two indenyl ligands are respectively substituted with a methyl group and an isopropyl group, low molecular weight polymer can be prepared due appropriate steric hindrance, and since both indenyl ligands respectively comprise an aryl group substituted with alkyl at the 4 position ($R_1$ and $R_5$), excellent catalytic activity may be exhibited due to inductive effect of supplying sufficient electrons. As the result, long chain branches (LCB) may be formed in the structure of homo polypropylene in an appropriate rate/distribution, and thus, high flowability homo polypropylene can be prepared.

And, since the compound of the Chemical Formula 1 comprises zirconium (Zr) as a center metal, compared to the case of comprising other Group 14 elements such as Hf, it has more orbitals capable of accepting electrons, and thus, can easily bond to monomers with high affinity, thereby exhibiting more excellent catalytic activity improvement effect.

More specifically, in the Chemical Formula 1, $R_1$ and $R_5$ are each independently, $C_{6-20}$ aryl substituted with $C_{1-20}$ alkyl, more specifically, a phenyl group substituted with a $C_{3-6}$ branched alkyl group such as a tert-butyl phenyl. And, the substitution of the alkyl group to the phenyl group may be at the 4 position corresponding to para position to the position of $R_1$ or $R_5$ bonded to the indenyl group.

And, in the Chemical Formula 1, $R_2$ to $R_4$, and $R_6$ to $R_8$ may be each independently, hydrogen, and $X_1$ and $X_2$ may be each independently, chloro, and A may be silicon.

Representative example of the compound represented by the Chemical Formula 1 is as follows:

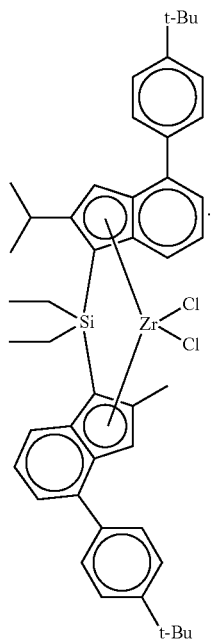

(1a)

The compound of the Chemical Formula 1 may be synthesized applying known reactions, and for more detailed synthesis method, preparation examples described below may be referred to.

Meanwhile, the compound of the Chemical Formula 1 may be used as a single component, or it may be used in the form of a supported catalyst that is supported on a carrier.

When used in the form of a supported catalyst, prepared polymer may have excellent particle shape and bulk density, and may be suitably used for the conventional slurry polymerization, bulk polymerization or gas phase polymerization process.

As the carrier, a carrier comprising a hydroxy group or a siloxane group on the surface may be used, and preferably, a carrier that is dried at high temperature to remove moisture on the surface, and comprises highly reactive hydroxy group and siloxane group may be used. As specific examples of the carrier, silica, alumina, magnesia, silica-alumina, silica-magnesia, and the like may be mentioned, and they may commonly further comprise oxide, carbonate, sulfate and nitrate components, such as $Na_2O$, $K_2CO_3$, $BaSO_4$, and $Mg(NO_3)_2$ and the like. Among them, in case a silica carrier is used, the functional groups of the metallocene compound are chemically bonded with the silica carrier and supported, catalyst is hardly isolated from the carrier surface during propylene polymerization, thereby minimizing fouling wherein polymer particles stick to a reactor wall surface or each other, when preparing polypropylene by slurry or gas phase polymerization.

In case the compound of the Chemical Formula 1 is supported on a carrier, and for example, the carrier is silica, the compound of the Chemical Formula 1 may be supported in the content of 40 μmol or more, or 80 μmol or more, and 240 μmol or less, or 160 μmol or less, based on 1 g of silica. When supported in the above content range, appropriate activity of the supported catalyst may be exhibited, and thus, it may be favorable in terms of catalytic activity maintenance and economical efficiency.

And, the catalyst composition may further comprise a cocatalyst in terms of high activity and improvement in process stability.

The cocatalyst may comprise one or more selected from compounds represented by the following Chemical Formula 2, compounds represented by the following Chemical Formula 3, and compounds represented by the following Chemical Formula 4:

$$-[Al(R_{11})-O]_m- \qquad \text{[Chemical Formula 2]}$$

In the Chemical Formula 2, $R_{11}$'s are identical or different, and are each independently, halogen; $C_{1-20}$ hydrocarbon; or $C_{1-20}$ hydrocarbon substituted with halogen;

m is an integer of 2 or more;

$$J(R_{12})_3 \qquad \text{[Chemical Formula 3]}$$

In the Chemical Formula 3, $R_{12}$'s are identical or different, and are each independently, halogen; $C_{1-20}$ hydrocarbon; or $C_{1-20}$ hydrocarbon substituted with halogen;

J is aluminum or boron;

$$[E-H]+[ZD_4]- \text{ or } [E]+[ZD_4]- \qquad \text{[Chemical Formula 4]}$$

In the Chemical Formula 4,

E is neutral or cationic Lewis base;

H is hydrogen atom;

Z is Group 13 element;

D's are identical or different, and are each independently, a $C_{6-20}$ aryl group or $C_{1-20}$ alkyl group, of which one or more hydrogen atoms are unsubstituted or substituted with halogen, $C_{1-20}$ hydrocarbon, alkoxy or phenoxy.

As the examples of the compound represented by the Chemical Formula 2, alkylaluminoxane based compounds, such as methylaluminoxane, ethylaluminoxane, isobutylaluminoxane or butylaluminoxane and the like, may be mentioned, and among them, one or mixtures of two or more may be used.

And, as the examples of the compound represented by the Chemical Formula 3, trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminum methoxide, dimethylaluminum ethoxide, trimethylboron, triethylboron, triisobutylboron, tripropylboron, or tributylboron and the like, may be mentioned, and among them, one or mixtures of two or more may be used.

And, as the examples of the compound represented by the Chemical Formula 4, triethylammonium tetraphenylboron, tributylammonium tetraphenylboron, trimethylammonium tetraphenylboron, tripropylammonium tetraphenylboron, trimethylammonium tetra(p-tolyl)boron, trimethylammonium tetra(o,p-dimethylphenyl)boron, tributylammonium tetra(p-trifluoromethylphenyl)boron, trimethylammonium tetra(p-trifluoromethylphenyl)boron, tributylammonium tetrapentafluorophenylboron, N,N-diethylaniliniumtetarphenylboron, N,N-diethylanilinium tetrapentafluorophenylboron, diethylammonium tetrapentafluorophenylboron, triphenylphosphonium tetraphenylboron, trimethylphosphonium tetraphenylboron, triethylammonium tetraphenylaluminum, tributylammonium tetraphenylaluminum, trimethylammonium tetraphenylaluminum, tripropylammonium tetraphenylaluminum, trimethylammonium tetra(p-tolyl) aluminum, tripropylammonium tetra(p-tolyl)aluminum, triethylammonium tetra(o,p-dimethylphenyl)aluminum, tributylammonium tetra(p-trifluoromethylphenyl)aluminum, trimethylammonium tetra(p-trifluoromethylphenyl) aluminum, tributylammonium tetrapentafluorophenyl aluminum, N,N-diethylanilinium tetraphenylaluminum, N,N-diethylanilinium tetrapentafluorophenylaluminum, diethylammonium tetrapentafluorophenylaluminum, triphenylphosphonium tetraphenylaluminum, trimethylphosphonium tetraphenylaluminum, tripropylammonium tetra(p-tolyl)boron, triethylammonium tetra(o,p-dimethylphenyl) boron, tributylammonium tetra(p-trifluoromethylphenyl) boron, triphenylcarbonium tetra(p-trifluoromethylphenyl) boron, or triphenylcarbonium tetrapentafluorophenylboron and the like, may be mentioned, and among them, one or mixtures of two or more may be used.

The cocatalyst may be, more specifically, an alkylaluminoxane based cocatalyst such as methylaluminoxane.

The alkylaluminoxane based cocatalyst comprises a metal element that can stabilize the transition metal compound of the Chemical Formula 1, and act as Lewis acid to form a bond through Lewis acid-base interaction with the functional group introduced in the bridge group of the transition metal compound of the Chemical Formula 1, thereby further enhancing catalytic activity.

And, the content of the cocatalyst may be appropriately controlled according to the aimed properties and effects of the catalyst and resin composition. For example, in case silica is used as the carrier, the cocatalyst may be supported in the content of 8 mmol or more, or 10 mmol or more, and 25 mmol or less, or 20 mmol or less, per carrier weight, for example, based on 1 g of silica.

And, the catalyst composition may further comprise an antistatic agent.

The antistatic agent can inhibit generation of static electricity when preparing homo polypropylene polymer, and further improve the properties of prepared homo polypropylene. As the antistatic agent, specifically, ethoxylated alkylamine, sulfonic acid and ester thereof, carboxylated metal salt or a mixture thereof may be used. More specifically, ethoxylated alkylamine, such as N,N-bis(2-hydroxyethyl)tridecylamine, N,N-bis(2-hydroxyethyl)pentadecylamine, or N,N-bis(2-hydroxyethyl)octadecylamine, and the like may be used. And, in the ethoxylated alkylamine, the alkyl may be $C_{8-22}$ linear alkyl, or $C_{10-18}$ linear alkyl, or $C_{13-15}$ linear alkyl. And, commercially available Atmer™ 163 (manufactured by Croda company), and the like may be used. In case the antistatic agent is further included, it may be included in an amount of 1 to 10 parts by weight, more specifically 1 part by weight or more, or 3 parts by weight or more, and 10 parts by weight or less, or 5 parts by weight or less, based on 100 parts by weight of the carrier.

The catalyst composition having the above construction may be prepared by a method comprising steps of supporting a cocatalyst compound in a carrier, and supporting a transition metal compound represented by the Chemical Formula 1 in the carrier, wherein the sequence of supporting the cocatalyst and the transition metal compound represented by the Chemical Formula 1 may be changed as necessary. Considering the effects of the supported catalyst having a structure determined by the supporting sequence, when a cocatalyst is supported in a carrier and then a transition metal compound is supported, the prepared supported catalyst may realize high catalytic activity and more excellent process stability during the preparation process of polypropylene. And, in case the catalyst composition further comprises an antistatic agent, after supporting the transition metal compound, a step of introducing the antistatic agent in the form of slurry in the carrier where the cocatalyst and transition metal of the Chemical Formula 1 are supported, and heat treating, may be further included.

Meanwhile, the homo polypropylene may be prepared by a polymerization process of contacting the catalyst composition comprising the transition metal compound of the Chemical Formula 1 with propylene monomers in the presence of hydrogen gas.

Wherein, the hydrogen gas performs a function for activating non-active sites of the metallocene catalyst and causing chain transfer reaction, thus controlling molecular weight. The metallocene compound of the invention has excellent hydrogen reactivity, and thus, by controlling the amount of the hydrogen gas used during polymerization, polypropylene having desired level of molecular weight and melt index may be effectively obtained.

The hydrogen gas may be introduced in an amount of 700 ppm or more, or 800 ppm or more, or 900 ppm or more, or 950 ppm or more, and 1500 ppm or less, or 1200 ppm or less, or 1100 ppm or less, or 1050 ppm or less, or 1000 ppm or less, based on the total weight of propylene monomers. By progressing polymerization while supplying hydrogen gas in such an amount, homo polypropylene having narrow molecular weight distribution and high flowability may be prepared.

And, the polymerization of homo polypropylene may be conducted by a continuous polymerization process, and for example, various polymerization processes known as a polymerization process of olefin monomers, such as solution polymerization, slurry polymerization, suspension polymerization, or emulsion polymerization, and the like, may be adopted. Particularly, for realization of narrow molecular weight distribution and high flow in the prepared homo polypropylene, and industrial production of the product, a continuous bulk slurry polymerization process in which a catalyst, propylene monomers, and optionally, hydrogen gas are continuously introduced, may be adopted.

And, the polymerization may be conducted at a temperature of 40° C. or more, or 60° C. or more, or 70° C. or more, and 110° C. or less or 100° C. or less, and under pressure of 1 kgf/cm$^2$ or more, or 5 kgf/cm$^2$ or more, or 20 kgf/cm$^2$ or more, or 30 kgf/cm$^2$ or more, and 100 kgf/cm$^2$ or less, or 50 kgf/cm$^2$ or less, or 40 kgf/cm$^2$ or less. When the polymerization is progressed under such temperature and pressure, homo polypropylene with aimed high flow may be prepared with high yield.

And, during the polymerization, trialkylaluminum such as triethylaluminum may be further introduced in the content of 0.01 wt % or more, or 0.05 wt % or more, or 0.1 wt % or more, and 1 wt % or less, or 0.5 wt % or less, based on the total weight of the propylene monomers. If moisture or impurity exists in a polymerization reactor, a part of a catalyst may be decomposed, but since the trialkylaluminum serves as a scavenger previously picking out moisture or impurity existing in the reactor, it can maximize the activity of a catalyst used for preparation, and thus, efficiently prepare homo polypropylene fulfilling the above described properties.

And, in the polymerization reaction, the catalyst composition may be used in the form of a mud catalyst mixed with oil and grease. In this case, compared to the conventional case wherein a catalyst composition is dissolved or diluted in C5 to 12 aliphatic hydrocarbon solvent, such as pentane, hexane, heptanes, nonane, decane, and isomers thereof; aromatic hydrocarbon solvent, such as toluene, benzene; chlorine-substituted hydrocarbon solvent, such as dichloromethane, dichlorobenzene, and the like, during propylene polymerization, the amount of volatile organic compounds contained in the prepared resin may remarkably decrease, and thus, odor caused thereby may also decrease.

Through the above explained polymerization process, homo polypropylene is prepared.

Meanwhile, common polypropylene preparation equipment is equipped with a steamer and a dryer using inert gas such as nitrogen, and immediately after preparing polymer, while homo polypropylene passes through the equipment, dust existing in the homo polypropylene is removed by humidification, and the humidified homo polypropylene is dried by the inert gas. Wherein, while the added steam and inert gas are discharged, a part of fine powder in the homo polypropylene may be removed together with dust. Thus, homo polypropylene prepared according to the invention may be obtained after at least a part of fine powder are removed by a dryer using inert gas. However, since a fine cut process is then conducted in the preparation method according to the invention, the fine powder removal process by steamer and dryer using nitrogen may be omitted. However, in order to obtain higher fine powder removal efficiency, the preparation method according to the invention may optionally comprise the fine powder removal process using steamer and dryer. The fine powder removal process using steamer and dryer may be conducted by a common method, and detailed explanations thereof are omitted herein.

And, for the homo polypropylene prepared through the above polymerization process, a drying process may be optionally conducted so as to improve process efficiency in the subsequent process.

The drying process may be conducted by a common method such as hot air drying, heat drying, natural drying, and the like.

Next, a fine cut step wherein fine powder having particle size less than 500 μm are removed from the homo polypropylene prepared above, is conducted.

Specifically, the fine cut step may be conducted by conducting one or more processes, or two or more processes, or all the processes selected from the group consisting of a fine powder removal process using a cyclone, a fine powder removal process using a vibrator screen, and a fine powder removal process by air blowing injection.

More specifically, the fine cut step may be conducted through a first fine powder removal process wherein the homo polypropylene prepared in step 1 is passed through a cyclon; a second fine powder removal process wherein it is passed through a vibrator screen; and then, a third fine powder removal process wherein air blowing is injected while dropping the homo polypropylene, and the separated fine powder are removed by suction together with air, and when conducting the fine cut step in such a process sequence, fine powder removal efficiency may be maximized.

Specifically, the fine powder removal process of passing through cyclon may be conducted by passing the homo polypropylene prepared and optionally dried in step 1 through a cyclon equipped at the upper stage of a storage silo during the process of transferring the homo polypropylene to a polymer storage silo under inert gas flow, thus removing fine powder having particle size less than 100 μm or less included in the homo polypropylene.

Thus, it is preferable that the conditions of the fine powder removal process through cyclon, such as flow rate, temperature, and the like, are appropriately so as to sufficiently remove fine powder of the above described particle size.

Specifically, when removing fine powder through cyclon, it is preferable that the flow rate of homo polypropylene is 5000 m³/hr or more, or 5500 m³/hr or more, or 6000 m³/hr or more, and 7000 m³/hr or less, or 6500 m³/hr or less.

And, it is preferable that the fine powder removal process through cyclon is conducted under inert gas flow such as nitrogen (N₂), argon, and the like, and it may be conducted at a temperature of 15° C. or more, or 20° C. or more, and 40° C. or less, or 30° C. or less, or 25° C. or less, preferably at room temperature (20±5° C.).

And, during the fine powder removal process through cyclon, it may be preferable that the cyclon has a capacity of inner diameter (ID) 1500 (mm)×total depth (TD) 5000 (mm).

And, the fine powder removal process using a vibrator screen may be conducted by removing fine powder having particles size less than 500 μm, more specifically 100 μm or more and less than 500 μm in the residual fine powder, using a vibrator screen, for the homo polypropylene.

Specifically, while applying vibration to homo polypropylene or homo polypropylene for which the first fine powder removal process has been conducted, the homo polypropylene may be passed through a screen having mesh sieve size of 490 to 510 μm, more specifically, 490 μm or more, or 495 μm or more, and 510 μm or less, or 505 μm or less, or 500 μm or less, or less than 500 μm according to ASTM standard.

When removing fine powder using a vibrator screen, it is preferable that the vibration conditions are specifically controlled to a frequency of 1500 to 2000 vibration/min, and vibration width greater than 0 mm and 3 mm or less. More specifically, the frequency is 1500 vibration/min or more, or 1600 vibration/min or more, or 1700 vibration/min or more, and 2000 vibration/min or less, or 1800 vibration/min or less, and the vibration width is greater than 0 mm, 0.5 mm or more, or 1 mm or more, or 1.5 mm or more, and 3 mm or less, or 2.5 mm or less, or 2 mm or less.

And, it is preferable that the screen has a diameter of 3 to 5 m, more specifically, 3 m or more, or 4 m or more, and 5 m or less.

And, the fine powder removal process by air blowing injection may be conducted during the process of transferring homo polypropylene to a packaging silo. Specifically, it may be conducted using a deduster capable of air blowing and air fine suction. Specifically, if the homo polypropylene is dropped to the packaging silo and air blowing is injected, fine powder included in the homo polypropylene are separated by blown air, and then, fine powder separated by suction unit are removed by suction together with air.

By controlling the air blowing conditions during the air blowing, fine powder removal efficiency can be further improved. Specifically, during air blowing, it is preferable that air flow rate is controlled to 10 m³/hr or more, or 50 m³/hr or more, or 100 m³/hr or more, or 150 m³/hr or more, or 200 m³/hr or more, and 500 m³/hr or less, or 400 m³/hr or less, or 300 m³/hr or less.

And, the fine powder removal process by air blowing injection may be conducted at a temperature of 15° C. or more, or 20° C. or more, and 40° C. or less, or 30° C. or less, or 25° C. or less, preferably at room temperature (20±5° C.).

The powder type polypropylene resin prepared by the method may have optimized morphology, such as decreased content of fine powder having particles size less than 500 μm in the resin, narrow particle size distribution, increased average particle size, and high Tm, and the like, thereby improving flowabilty in a hooper and feeding stability in the feeding zone of an extruder. Thus, during melt blown spinning or extrusion using the resin, discharge amount and gear pump shear pressure may increase, and gear pump shear pressure and extruder torque (load) may be stabilized, thus exhibiting improved spinning stability and processability. Thus, it is particularly useful when preparing fiber through extrusion, particularly, melt blown process.

Specifically, the powder type polypropylene resin has flow index of 0.1 or less, more specifically 0.1 or less, or 0.08 or less, or 0.06 or less, and 0.01 or more, when measured using powder flow testers. If the flow index is greater than 0.1, there is a concern about deterioration of spinning property.

The measurement method and conditions of the flow index will be explained in more detail in experimental examples later.

Thus, according to another embodiment of the invention, there is provided fiber, specifically, melt blown non-woven fabric, prepared using the powder type polypropylene resin.

Hereinafter, preferable examples will be presented for better understanding of the invention. However, these examples are presented only as the illustrations of the invention, and the invention is not limited thereby.

Preparation of Catalyst

Preparation Example 1

Step 1: Preparation of Transition Metal Compound

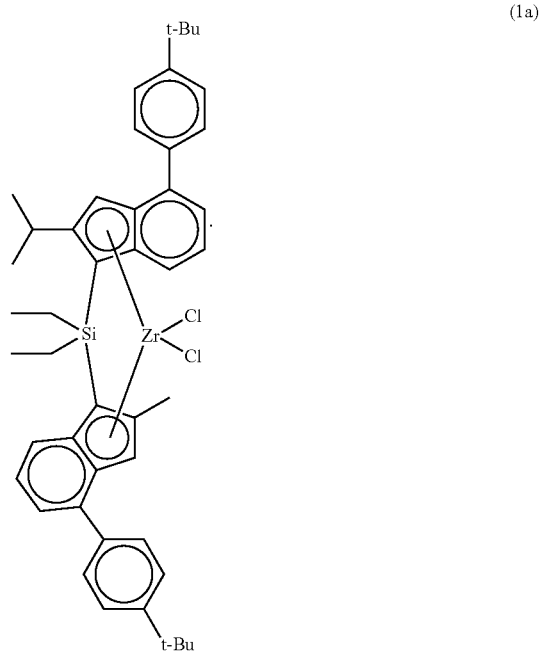

(1a)

Into a 250 mL Schlenk flask, 7-tert-butylphenyl-2-isopropylindene (10.0 g, 34.4 mmol) was put and decompression dried. It was diluted by adding anhydrous diethyl ether (172 mL) under argon atmosphere, and then, n-BuLi 2.5 M in hexane (36.2 mmol, 14.5 mL) was slowly added at 25° C. After stirring at 25° C. for 4 hours or more, Et₂SiCl₂ (34.4 mmol, 5.15 mL) was added to the resulting reactant, and the mixture was stirred at 25° C. overnight. The resulting reactant was dried to completely remove the solvents, and then, diluted by adding hexane, LiCl was filtered using a G4 size glass filter, and the filtrate was decompression dried, thus obtaining reactant A.

Into a separate 250 mL Schlenk flask, 7-tert-butylphenyl-2-methylindene (9.04 g, 34.4 mmol) and CuCN (1.72 mmol, 0.15 g) were put and decompression dried. It was diluted by adding anhydrous toluene (208 mL) and THF (20.4 mL) under argon atmosphere, and then, n-BuLi 2.5 M in hexane (36.2 mmol, 14.5 mL) was slowly added at −25° C., and the mixture was stirred at 25° C. overnight. The above prepared reactant A was introduced therein, and the mixture was stirred at 25° C. overnight, and then, extracted using water, and dried to obtain a ligand compound.

Into a separate 100 mL Schlenk flask, tert-butylamine (10.7 mmol, 1.1 mL) was put, and diluted by adding anhydrous toluene (11.8 mL) and THF (0.86 mL) under argon atmosphere, and then, at −25° C., n-BuLi 2.5 M in hexane (11.2 mmol, 4.48 mL) was slowly added. After stirring at 25° C. for 2 hours or more, the mixture was introduced in another schlenk flask containing $ZrCl_4 \cdot 2THF$ (4.03 g, 10.7 mmol) and toluene (9.3 mL) at −25° C., and stirred at 25° C. for 2 hours or more to obtain a Zr-tert-butylamide solution.

Into a separate 100 mL Schlenk flask, the above prepared ligand compound (6.81 g, 10.7 mmol) was put and decompression dried. It was diluted by adding anhydrous toluene (16.0 mL) and THF (1.60 mL) under argon atmosphere, and then, at −25° C., n-BuLi 2.5 M in hexane (22.5 mmol, 9.00 mL) was slowly added. After stirring at 25° C. for 2 hours or more, the Zr-tert-butylamide solution prepared above was added at −25° C. After stirring at 25° C. overnight, HCl 1.0 M in diethyl ether (23.5 mmol, 23.5 mL) was added at −25° C., and the mixture was stirred for about 1 hour until the temperature became 25° C. The resulting reactant was filtered using a G4 size glass filter, and the obtained filtrate was decompression dried. The dried filtrate was put in hexane, stirred to wash off impurities, washed again using hexane, thus separately obtaining racemic transition metal compound (1a) as catalyst precursor.

Step 2: Preparation of Supported Catalyst

Into a 3 L reactor, 150 g of silica and 10 wt % methyl-aluminoxane solution (1214 g, toluene solvent) were put, and reacted at 95° C. for 24 hours. After precipitation, the supernatant was removed, and the remaining reaction product was washed with toluene twice. 9.6 g of the above prepared transition metal compound (1a) was diluted in 500 ml of toluene and added to the reactor, and then, reacted at 50° C. for 5 hours. After the reaction was completed, when precipitation was finished, the supernatant solution was removed, the remaining reaction product was washed with toluene and then washed with hexane again, and 4.5 g of an antistatic agent Atmer 163™ (manufactured by CRODA company) was added, and the solution was filtered and decompression dried to obtain 250 g of a silica supported metallocene catalyst in the form of solid particles.

Comparative Preparation Example 1

Step 1: Preparation of Transition Metal Compound

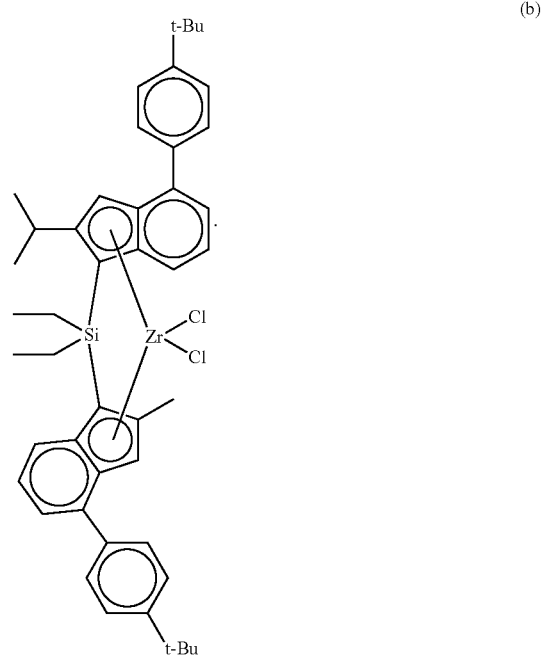

(b)

2-methyl-4-tert-butyl-phenylindene (20.0 g) was dissolved in a solution (220 mL) of toluene/TFH of volume ratio=10/1, and then, n-butyl lithium solution (2.5 M, in hexane, 22.2 g) was slowly added dropwise at 0° C., and the solution was stirred at room temperature for a day. To the resulting mixed solution, diethylchlorosilane (6.2 g) was slowly added dropwise at −78° C., and the solution was stirred for about 10 minutes, and then, additionally stirred at room temperature for a day. And then, water was added to separate an organic layer, and the solvents were decompression distilled to obtain (diethylsilane-diyl)-bis(2-methyl-4-(4-tert-butylphenyl)indenyl)silane.

The above prepared (diethylsilane-diyl)-bis(2-methyl-4-(4-tert-butylphenyl)indenyl)silane was dissolved in a solution (120 mL) of toluene/THF of volume ratio=5/1, and then, n-butyl lithium solution (2.5M, in hexane, 22.2 g) was slowly added dropwise at −78° C., and the solution was stirred at room temperature for a day. To the obtained reaction solution, a solution prepared by diluting zirconium chloride (8.9 g) in toluene (20 mL) was slowly added dropwise at −78° C., and the solution was stirred at room temperature for a day. After removing the solvents in the obtained reaction solution, dichloromethane was put and the solution was filtered, and the filtrate was decompression distilled and removed. It was recrystallized using toluene and hexane to obtain a transition metal compound (b) of the above structure (10.1 g, yield 34%).

Step 2: Preparation of Supported Catalyst

A supported catalyst was prepared by the same method as the step 2 of Preparation Example 1, except using the transition metal compound (b) prepared in the step 1.

Comparative Preparation Example 2

Step 1: Preparation of Transition Metal Compound

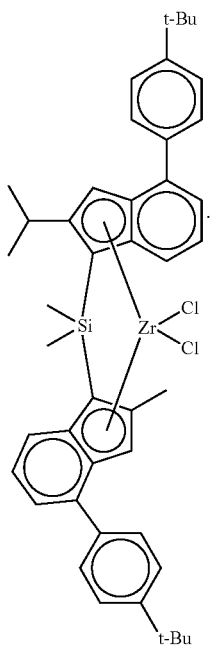

(c)

Into a 250 mL Schlenk flask, 7-tert-butylphenyl-2-isopropylindene (10.0 g, 34.4 mmol) was put and decompression dried. It was diluted by adding anhydrous diethyl ether (172 mL) under argon atmosphere, and then, n-BuLi 2.5 M in hexane (36.2 mmol, 14.5 mL) was slowly added at 25° C. After stirring at 25° C. for 4 hours or more, Me$_2$SiCl$_2$ (68.9 mmol, 8.30 mL) was added to the resulting reactant, and the mixture was stirred at 25° C. overnight. The resulting reactant was dried to completely remove the solvents, and then, diluted by adding hexane, LiCl was filtered using a G4 size glass filter, and the filtrate was decompression dried, thus obtaining reactant B.

Into a separate 250 mL Schlenk flask, 7-tert-butylphenyl-2-methylindene (9.04 g, 34.4 mmol) and CuCN (1.72 mmol, 0.15 g) were put and decompression dried. It was diluted by adding anhydrous toluene (208 mL) and THF (20.4 mL) under argon atmosphere, and then, n-BuLi 2.5 M in hexane (36.2 mmol, 14.5 mL) was slowly added at −25° C., and the mixture was stirred at 25° C. overnight. The above prepared reactant B was introduced therein, and the mixture was stirred at 25° C. overnight, and then, extracted using water, and dried to obtain a ligand compound.

Into a separate 100 mL Schlenk flask, tert-butylamine (7.09 mmol, 0.74 mL) was put, and diluted by adding anhydrous toluene (7.88 mL) and THF (0.57 mL) under argon atmosphere, and then, at −25° C., n-BuLi 2.5 M in hexane (11.2 mmol, 4.48 mL) was slowly added. After stirring at 25° C. for 2 hours or more, the mixture was added to another schlenk flask containing ZrCl$_4$·2THF (2.67 g, 7.09 mmol) and toluene (6.2 mL) at −25° C., and stirred at 25° C. for 2 hours or more to obtain a Zr-tert-butylamide solution.

Into a separate 100 mL Schlenk flask, the above prepared ligand compound (4.32 g, 7.09 mmol) was put and decompression dried. It was diluted by adding anhydrous toluene (11.8 mL) and THF (1.18 mL) were added to dilute under argon atmosphere, and then, at −25° C., n-BuLi 2.5 M in hexane (14.9 mmol, 5.96 mL) was slowly added. After stirring at 25° C. for 2 hours or more, the Zr-tert-butylamide solution prepared above was added at −25° C. After stirring at 25° C. overnight, HCl 1.0 M in diethyl ether (15.6 mmol, 15.6 mL) was added at −25° C., and the mixture was stirred for about 1 hour until the temperature became 25° C. The resulting reactant was filtered using a G4 size glass filter. The obtained solid comprises racemic rich transition metal compound together with salt, and it was dissolved in dichloromethane, and then, filtered, and the filtrate was decompression dried, and then, washed with hexane again to obtain a transition metal compound (c) of the above structure.

Step 2: Preparation of Supported Catalyst

Into a 3 L reactor, 150 g of silica and 10 wt % methylaluminoxane solution (1214 g, toluene solvent) were put, and reacted at 95° C. for 24 hours. After precipitation, the supernatant was removed, and the remaining reaction product was washed with toluene twice. 9.6 g of the above prepared transition metal compound (c) was diluted in 500 ml of toluene and added to the reactor, and then, reacted at 50° C. for 5 hours. After the reaction was completed, when precipitation was finished, the supernatant solution was removed, the remaining reaction product was washed with toluene and then washed with hexane again, and 4.5 g of an antistatic agent Atmer 163™ (manufactured by CRODA company) was added, and the solution was filtered and decompression dried to obtain 250 g of a silica supported metallocene catalyst in the form of solid particles.

Comparative Preparation Example 3

A transition metal compound (d) of the following structure and a silica supported metallocene catalyst comprising the same were respectively prepared by the same method as Preparation Example 1, except that in the step 1 of Preparation Example 1, 7-phenyl-2-isopropylindene and 7-phenyl-2-methylindene were respectively used, instead of 7-tert-butylphenyl-2-isopropylindene and 7-tert-butylphenyl-2-methylindene.

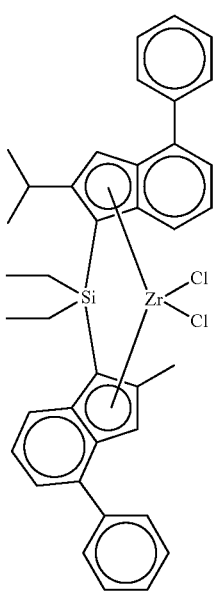

(d)

Preparation of Polypropylene Resin

Example 1

Step 1: Preparation of Homo Polypropylene

In the presence of the silica supported metallocene catalyst prepared in Preparation Example 1, bulk-slurry polymerization of propylene was progressed using continuous 2 loop reactors. Wherein, triethylaluminum (TEAL) and hydrogen gas were introduced respectively using a pump, and the above prepared supported catalyst was mixed with oil and grease in the amount of 16 wt % and used in the form of a mud catalyst. Homo polypropylene was polymerized and prepared while maintaining catalyst input of 5 cc/hr, TEAL input of 2 g/hr (corresponding to 0.05 g/kg, based on the total weight of propylene monomers), reactor temperature of 70° C., and production amount per hour of 40 kg. And then, passing through a steamer and a dryer using nitrogen gas, homo polypropylene was obtained.

Step 2: Preparation of Powder Type Polypropylene Resin

For the homo polypropylene prepared in the step 1, a fine cut process was conducted to prepare powder type polypropylene resin.

Specifically, when transferring the homo polypropylene prepared in the step 1 to a storage silo, it was passed through a cyclon equipped at the upper stage of the silo at room temperature under nitrogen ($N_2$) flow, thereby firstly removing fine powder included in the homo polypropylene. Wherein, using a cyclon with a capacity of ID 1500 (mm)× TD 5000 (mm), at the homo polypropylene input flow rate of 6000 $m^3$/hr, fine powders having particle size of 100 μm or less in the homo polypropylene were removed.

And then, for the firstly fine-removed homo polypropylene, fine powder were secondly removed using a vibrator screen under conditions of frequency of 1800 vibration/min and vibration width of 1.5 mm. Wherein, the screen had a size of 4 m, the sieve size of mesh was 500 μm according to ASTM standard, and fine powders having particle size of 500 μm or less were removed.

Subsequently, while dropping the secondly fine-removed homo polypropylene for transfer to a packaging silo, for the dropping homo polypropylene, air blowing and air fine suction were conducted using a deduster to thirdly remove fine powder. The air blowing was conducted at room temperature at the air flow rate of 200 $m^3$/hr.

Example 2

Powder type polypropylene resin was prepared by the same method as Example 1, except that in the step 1 of Example 1, when preparing homo polypropylene, hydrogen input condition was changed as described in the following Table 1.

Example 3

Powder type polypropylene resin was prepared by the same method as Example 1, except that in the step 2 of Example 1, the fine cut process was conducted only by the fine powder removal process by air blowing.

Specifically, while dropping the homo polypropylene prepared by the same method as the step 1 of Example 1 for transfer to a packing silo, for the dropping homo polypropylene, air blowing and air fine suction were conducted using a deduster to remove fine powder. Wherein, the air blowing was conducted at room temperature at the air flow rate of 200 $m^3$/hr.

Example 4

Powder type polypropylene resin was prepared by the same method as Example 1, except that in the step 2 of Example 1, the fine cut process was conducted only by fine powder removal processes using a vibrator screen and air blowing.

Specifically, in the homo polypropylene prepared by the same method as the step 1 of Example 1, fine powder were removed using a vibrator under conditions of frequency of 1800 vibration/min and vibration width of 2 mm. Wherein, the screen had a size of 4 m, the sieve size of mesh was 500 μm according to ASTM standard, and fine powders having particle size of 500 μm or less were removed.

Subsequently, while dropping the fine powder removed homo polypropylene for transfer to a packaging silo, for the dropping homo polypropylene, air blowing and air fine suction were conducted using a deduster to remove fine powder. Wherein, the air blowing was conducted at room temperature at the air flow rate of 200 $m^3$/hr.

Comparative Example 1

As homo polypropylene, commercially available MF650Y™ (manufactured by Basell company) was used (fine cut process not conducted).

Comparative Example 2

As homo polypropylene, commercially available MF650Z™ (manufactured by Basell company) was used (fine cut process not conducted).

Comparative Example 3

Powder type polypropylene was prepared by the same method as Example 1, except that in Example 1, the fine cut process of the step 2 was not conducted.

Comparative Example 4

Powder type polypropylene was prepared by the same method as Example 1, except that the conditions in the steps 1 and 2 of Example 1 were changed to the conditions described in the following Table 1.

Comparative Example 5

Powder type polypropylene was prepared by the same method as Comparative Example 3, except that in the step 1 of Comparative Example 3, when preparing homo polypropylene, hydrogen input was 1050 ppm.

Comparative Example 6

Powder type polypropylene was prepared by the same method as Comparative Example 4, except that in the step 1 of Comparative Example 4, when preparing homo polypropylene, hydrogen input was 900 ppm.

Comparative Examples 7 to 10

Powder type polypropylene was prepared by the same method as Example 1, except that the conditions of the steps 1 and 2 of Example 1 were changed as described in the following Table 1.

TABLE 1

| | | Example | | | | Comparative Example | | | |
|---|---|---|---|---|---|---|---|---|---|
| | | 1 | 2 | 3 | 4 | 1 | 2 | 3 | 4 |
| Preparation of homopoly propylene | catalyst | Preparation Example 1 | Preparation Example 1 | Preparation Example 1 | Preparation Example 1 | MF650Y ™ (manufactured by Basell) | MF650Z ™ (manufactured by Basell) | Preparation Example 1 | Comparative Preparation Example 1 |
| | Polymerization temperature (° C.) | 70 | 70 | 70 | 70 | | | 70 | 70 |
| | pressure (kg/cm²) | 37 | 37 | 37 | 37 | | | 37 | 37 |
| | Propylene input (kg/hr) | 40 | 40 | 40 | 40 | | | 40 | 40 |
| | hydrogen input (ppm) | 900 | 1050 | 900 | 900 | | | 900 | 800 |
| Fine cut process | Whether or not conducted | conducted | conducted | conducted | conducted | Not conducted | Not conducted | Not conducted | conducted |

| | | Comparative Example | | | | | |
|---|---|---|---|---|---|---|---|
| | | 5 | 6 | 7 | 8 | 9 | 10 |
| Preparation of homopoly propylene | catalyst | Preparation Example 1 | Comparative Preparation Example 1 | Comparative Preparation Example 2 | Comparative Preparation Example 3 | Comparative Preparation Example 1 | Comparative Preparation Example 1 |
| | Polymerization temperature (° C.) | 70 | 70 | 70 | 70 | 70 | 70 |
| | pressure (kg/cm²) | 37 | 37 | 37 | 37 | 37 | 37 |
| | Propylene input (kg/hr) | 40 | 40 | 40 | 40 | 40 | 40 |
| | hydrogen input (ppm) | 1050 | 900 | 950 | 947 | 300 | 1100 |
| Fine cut process | Whether or not conducted | Not conducted | conducted | conducted | conducted | conducted | conducted |

In the Table 1, hydrogen input (ppm) was a weight value based on propylene input(weight).

Experimental Example 1

Evaluation of the Properties of Polypropylene Resin

For the polypropylene resins prepared in Examples and Comparative Examples, property evaluation was conducted as follows. The results were shown in the following Table 2.

(1) Melt index (MI, 2.16 kg): measured under load of 2.16 kg at 230° C. according to ASTM D1238, and indicated as the weight (g) of the polymer that was molten and came out for 10 minutes. For reference, MI values of the polypropylene resins of Comparative Example 1 and Comparative Example 2 described in the following Table 2 are experimental values obtained by actually measuring the MI's of the polypropylene resins prepared in Comparative Examples 1 and 2.

(2) Molecular weight distribution (MWD, polydispersity index): Using gel permeation chromatography (GPC), weight average molecular weight (Mw) and number average molecular weight (Mn) of the polymer were measured, and the measured weight average molecular weight was divided by number average molecular weight to calculate molecular weight distribution (MDW, Mw/Mn).

Specifically, as gel permeation chromatography (GPC) device, Waters PL-GPC220 was used, and Polymer Laboratories PLgel MIX-B 300 mm length column was used. Wherein, measurement temperature was 160° C., 1,2,4-trichlorobenzene was used as a solvent, and flow rate was 1 mL/min. The polypropylene samples according to Examples and Comparative Examples were respectively prepared at a concentration of 10 mg/10 mL, and then, fed in an amount of 200 μL. Using a calibration curve formed using a polystyrene standard specimen, Mw and Mn values were derived. As the polystyrene standard specimens, 9 kinds having weight average molecular weight of 2,000 g/mol/10,000 g/mol/30,000 g/mol/70,000 g/mol/200,000 g/mol/700,000 g/mol/2,000,000 g/mol/4,000,000 g/mol/10,000,000 g/mol were used.

(3) Melting point (Tm): The temperature of the polypropylene resin was increased to 200° C., maintained for 5 minutes, and decreased to 30° C., and then, increased again, and the top of DSC (Differential Scanning calorimeter, manufactured by TA Corp.) curve was determined as a melting point. Wherein, the temperature increase and decrease speeds were respectively 10° C./min, and as the melting point, the measurement result in the second temperature increase section was used.

(4) Fine powder content (wt %)

After vibrating the polypropylene resins prepared in Examples and Comparative Examples for 10 minutes, they were sieved using mesh (sieve size 500 μm), and the content of sieved fine powder having particle size less than 500 μm was indicated as percentage based on the total weight of polypropylene resin.

(5) SPAN and Average Particle Size (D50; μm)

Using a light diffraction particle size analyzer (Sympatec, HELIOS), average particle size and SPAN were measured.

Specifically, after injecting a sample in the hooper of the light diffraction particle size analyzer, particle size distribution was measured in the range of 50~3500 μm, and using the result, average particle size (D50) and SPAN were calculated.

$$SPAN=(D90-D10)/D50 \quad \text{[Mathematical Formula 1]}$$

(in the Mathematical Formula 1, D50 is a particle size of homo polypropylene at 50% point of cumulative distribution, D90 is a particle size of homo polypropylene at 90% point of cumulative distribution, and D 10 is a particle size of homo polypropylene at 10% point of cumulative distribution, in the cumulative distribution of particle number according to the particle size of homo polypropylene.).

(diameter: 0.15 mm), under conditions of barrel temperature 220~230° C. (Feeding Zone 220° C./the lower stage of hooper and screw were cooled with cooling water), gear pump and die temperature 230° C., screw rpm 13 and gear pump rpm 8, melt blown spinning was conducted, and change in the amount of molten polypropylene that was discharged from the extruder, namely, discharge amount change, gear pump shear pressure, and screw torque were respectively measured. The discharge amount (g/min) from the extruder was determined by actually measuring the amount of molten polypropylene resin that was discharged from the front of gear pump, namely, from the extruder (not die discharge amount). After repeated measurement, the discharge amount, gear pump shear pressure and screw torque were respectively shown by the average values, and for gear pump shear pressure and screw torque, standard deviations were shown together.

TABLE 2

|  | Example | | | | Comparative Example | | | | | | | | | |
|---|---|---|---|---|---|---|---|---|---|---|---|---|---|---|
|  | 1 | 2 | 3 | 4 | 1 | 2 | 3 | 4 | 5 | 6 | 7 | 8 | 9 | 10 |
| MI (g/10 min) | 1790 | 2280 | 1805 | 1800 | 1850 | 2310 | 1794 | 1784 | 2285 | 2310 | 1792 | 1832 | 305 | 3410 |
| MWD | 2.2 | 2.2 | 2.2 | 2.2 | 2.2 | 2.2 | 2.2 | 2.8 | 2.2 | 2.9 | 2.2 | 2.2 | 2.2 | 2.9 |
| Tm (° C.) | 156 | 156 | 156 | 156 | 154 | 154 | 156 | 154 | 156 | 154 | 154 | 155 | 154 | 154 |
| Fine powder content (wt %) | 1 | 1.2 | 1.2 | 1.1 | 2.5 | 2.6 | 8.9 | 1 | 9.3 | 1 | 1.7 | 1.2 | 1 | 1.1 |
| SPAN | <0.6 | <0.6 | <0.6 | <0.6 | 0.65 | 0.67 | 1.0 | <0.5 | 1.1 | <0.6 | <0.6 | <0.6 | <0.5 | <0.6 |
| Average particle size(D50) (μm) | 1538 | 1584 | 1480 | 1510 | 1082 | 1109 | 1421 | 850 | 1490 | 908 | 805 | 799 | 820 | 940 |

Experimental Example 2

Using the polypropylene resins prepared in Examples and Comparative Examples, melt blown spinning was conducted under the spinning conditions as described in the following Table 3, and discharge amount in the extruder, gear pump shear pressure and screw torque were measured to evaluate flowability in the hooper and feeding stability in the feeding zone of the extruder. The results were shown in the following Table 4.

(1) Spinning Conditions

TABLE 3

| Screw(rpm) | 13 |
|---|---|
| Extrusion Temp.(° C.) B1/B2/B3/B4 | 220/225/225/230 |
| Gear Pump(rpm) | 8 |
| Gaer Pump Temp.(° C.) | 230 |

(2) Discharge Amount in Extruder, Gear Pump Shear Pressure and Screw Torque

Using a melt blown spinning apparatus consisting of a single screw extruder (Single Screw L/D 25), gear pump, die (manufactured by Spin Beam, die length: 1 m), and nozzle (3) Flow Index Flow index was measured using powder flow testers (AMETEK brooksfield equipment). Specifically, in the lower sample trough of powder flow testers, the polypropylene resins prepared in Examples and Comparative Examples were filled without empty spaces, and covered with vane type lid, and then, 10 kpa or more load was vertically applied to form powder cake (agglomerated powder lump), and then, flow (external force) by rotation was applied until the cake was broken. Wherein, during rotation, stress when the polypropylene resin cake was broken was measured, and while sequentially increasing the vertical load, stresses according to each vertical load were repeatedly measured. Wherein, it was plotted with the vertical load as X axis, and the stress when cake was broken as Y axis, and flow index was calculated using powder flow pro software application.

TABLE 4

| | Example | | | | Comparative Example | | | | | | | | | |
|---|---|---|---|---|---|---|---|---|---|---|---|---|---|---|
| | 1 | 2 | 3 | 4 | 1 | 2 | 3 | 4 | 5 | 6 | 7 | 8 | 9 | 10 |
| Flow index | 0.06 | 0.06 | 0.07 | 0.08 | 0.18 | 0.16 | 0.25 | 0.28 | 0.22 | 0.26 | 0.27 | 0.26 | 0.30 | 0.24 |
| Discharge amount from extruder (g/min) | 65 | 65 | 63 | 62 | 58 | 57 | 51 | 48 | 49 | 46 | 47 | 47 | 46 | 48 |
| Gear pump shear pressure (mbar) | 30 | 25 | 29 | 29 | 14 | 12 | Lo | Lo | Lo | Lo | Lo | Lo | Lo | Lo |
| Standard deviation of gear pump shear pressure | 0.01 | 0.01 | 0.01 | 0.01 | 0.04 | 0.06 | None | None | None | None | None | None | None | None |
| Screw torque (Nm) | 9.19 | 8.95 | 9.2 | 9.0 | 12.25 | 11.0 | 15.01 | 15.84 | 15.53 | 16.02 | 15.94 | 15.91 | 15.90 | 15.5 |
| Standard deviation of screw torque | 0.78 | 0.76 | 0.8 | 0.76 | 1.83 | 1.80 | 2.21 | 2.51 | 2.31 | 2.61 | 2.52 | 2.58 | 2.53 | 2.42 |

In the Table 4, "Lo" means that a value below measurable values is shown, and "None" means unmeasurable.

As the result of experiments, in the case of Examples 1 to 4 wherein a fine cut process was conducted after polymerization of homo polypropylene, compared to Comparative Examples, discharge amount and gear pump shear pressure increased, and gear pump shear pressure and extruder torque were stabilized.

The invention claimed is:

1. A polypropylene resin in a powder form comprising homo polypropylene, and satisfying requirements (i) to (v), wherein:
   (i) a melt index measured under load of 2.16 kg at 230° C. according to ASTM D1238 is 500 to 3000 g/10 min,
   (ii) a melting point is 155° C. or more,
   (iii) SPAN according to the following Mathematical Formula 1 is 0.6 or less,
   (iv) an average particle size D50 is greater than 1200 μm and 1600 μm or less, and
   (v) a content of fine powder having particle size less than 500 μm is 2 wt % or less, based on the total weight of polypropylene resin:

$$SPAN=(D90-D10)/D50 \quad \text{[Mathematical Formula 1]}$$

wherein, in Mathematical Formula 1, D50 is a particle size of the homo polypropylene at 50% point of cumulative distribution, D90 is a particle size of the homo polypropylene at 90% point of cumulative distribution, and D10 is a particle size of the homo polypropylene at 10% point of cumulative distribution, in the cumulative distribution of particle number according to the particle size of the homo polypropylene.

2. The polypropylene resin according to claim 1, wherein the polypropylene resin further satisfies one or more requirements of (i-1) to (v-1), wherein:
   (i-1) the melt index measured under load of 2.16 kg at 230° C. according to ASTM D1238 is 1700 to 2300 g/10 min,
   (ii-1) the melting point: is 155° C. to 170° C.,
   (iii-1) the SPAN according to the Mathematical Formula 1 is 0.1 to 0.6,
   (iv-1) the average particle size D50: is 1300 μm to 1600 μm, and
   (v-1) the content of the fine powder: is 1.5 wt % or less.

3. A method for preparing the powder type polypropylene resin according to claim 1, comprising
   polymerizing propylene monomers while introducing hydrogen gas, in the presence of a catalyst composition comprising a transition metal compound represented by Chemical Formula 1, to prepare homo polypropylene; and
   separating and removing fine powder having particle size less than 500 μm from the homo polypropylene;
   wherein the separating and removing comprises conducting one or more processes selected from the group consisting of a fine powder removal process using a cyclone, a fine powder removal process using a vibrator screen, and a fine powder removal process by air blowing injection:

Chemical Formula 1

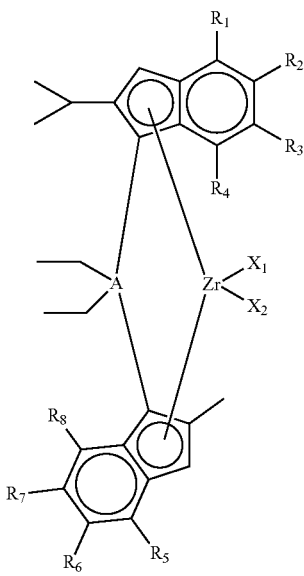

wherein, in Chemical Formula 1,

A is carbon, silicon or germanium, $X_1$ and $X_2$ are each independently, halogen, $R_1$ and $R_5$ are each independently, $C_{6-20}$ aryl substituted with $C_{1-20}$ alkyl, $R_2$ to $R_4$, and $R_6$ to $R_8$ are each independently, hydrogen, halogen, $C_{1-20}$ alkyl, $C_{2-20}$ alkenyl, $C_{1-20}$ alkylsilyl, $C_{1-20}$ silylalkyl, $C_{1-20}$ alkoxysilyl, $C_{1-20}$ ether, $C_{1-20}$ silylether, $C_{1-20}$ alkoxy, $C_{6-20}$ aryl, $C_{7-20}$ alkylaryl, or $C_{7-20}$ arylalkyl.

4. The method according to claim 3, wherein, in Chemical Formula 1, A is silicon, and $R_1$ and $R_5$ are each independently, a phenyl substituted with $C_{3-6}$ branched alkyl.

5. The method according to claim 3, wherein the compound of Chemical Formula 1 is a compound represented by Chemical Formula 1a:

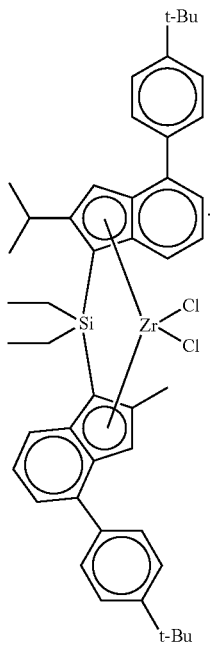

[Chemical Formula 1a]

6. The method according to claim 3, wherein the catalyst composition further comprises a silica carrier; and a cocatalyst, and the cocatalyst comprises a compound represented by Chemical Formula 2, a compound represented by Chemical Formula 3, a compound represented by Chemical Formula 4, or a mixture thereof:

—[Al($R_{11}$)—O]$_m$—   [Chemical Formula 2]

wherein, in the Chemical Formula 2, each $R_{11}$ is the same or different from each other, and is independently halogen; $C_{1-20}$ hydrocarbon; or $C_{1-20}$ hydrocarbon substituted with halogen; and m is an integer of 2 or more;

J($R_{12}$)$_3$   [Chemical Formula 3]

wherein, in Chemical Formula 3, each $R_{12}$ is the same or different from each other, and is independently, halogen; $C_{1-20}$ hydrocarbon; or $C_{1-20}$ hydrocarbon substituted with halogen; and J is aluminum or boron;

[E–H]+[ZD$_4$]– or [E]+[ZD$_4$]–   [Chemical Formula 4]

wherein, in Chemical Formula 4,

E is a neutral or cationic Lewis base;

H is a hydrogen atom;

Z is a Group 13 element;

each D is the same or different from each other, and is independently, $C_{6-20}$ aryl or $C_{1-20}$ alkyl, and the D is unsubstituted or substituted with halogen, $C_{1-20}$ hydrocarbon, alkoxy or phenoxy.

7. The method according to claim 3, wherein the hydrogen gas is introduced in an amount of 700 to 1500 ppm, based on a total weight of propylene monomers.

8. The method according to claim 3, wherein the fine powder removal process using a cyclone is conducted by removing fine powder having particle sizes of 100 μm or less in the homo polypropylene, while passing the homo polypropylene through the cyclone at a flow rate of 5000 to 7000 m³/hr under inert gas flow.

9. The method according to claim 3, wherein the fine powder removal process using a vibrator screen is conducted by removing fine powder having particle sizes less than 500 μm in the homo polypropylene, under frequency of 1500 to 2000 vibration/min and vibration width greater than 0 mm and 3 mm or less, using a vibrator screen having mesh sieve size of 490 to 510 μm.

10. The method according to claim 3, wherein the fine powder removal process by air blowing injection is conducted by injecting air blowing to the homo polypropylene under air flow of 10 to 500 m³/hr, to remove fine powder having particle sizes less than 500 μm in the homo polypropylene.

11. The method according to claim 3, wherein the separating and removing are conducted through a first fine powder removal process of passing the homo polypropylene through a cyclone; a second fine powder removal process using a vibrator screen for the homo polypropylene obtained after the first fine powder removal; and a third fine powder removal process of injecting air blowing while dropping the homo polypropylene obtained after the second fine powder removal, to remove fine powder by suction.

12. A melt blown non-woven fabric comprising the polypropylene resin according to claim 1.

* * * * *